Jan. 16, 1962     M. HEBEL ET AL     3,017,095
ELECTRIC MULTIPLYING ARRANGEMENT
Filed May 15, 1959     7 Sheets-Sheet 1

Fig. 5b 3,017,095
Patented Jan. 16, 1962

3,017,095
ELECTRIC MULTIPLYING ARRANGEMENT
Martin Hebel and Gunther Schweitzer, Nurnberg, Germany, assignors to Max Grundig, Furth, Bavaria, Germany
Filed May 15, 1959, Ser. No. 813,601
21 Claims. (Cl. 235—159)

The present invention refers to electric multiplying arrangements designed for sequentially producing multi-digit multiplication products in decimally coded form, the arrangement being applicable to calculating, bookkeeping or similar machines.

Electric multiplying arrangements of conventional type comprise several groups of circuits which are interconnected for constituting a multiplying arrangement. In such arrangements ten groups of ten circuits are each associated with number values ranging between 0 and 9, said circuits being connected via contacts with two groups of output circuits associated with the number values 0 to 9 and 10 to 80, respectively, corresponding to the 82 possible products formed from two one-digit decimal numbers. For each multiplication one of said ten groups is connected, depending upon the particular factor, by means of a multicontact relay with the output lines while one of the circuits associated with the number values 0 to 9 is provided with electrical potential by closing a contact, common to all said groups, and associated with the other factor. In this manner the product of the two factors is delivered in the form of a signal in said output lines. However, arrangements of this type entail the disadvantage that the number values must be processed in not-coded form which results in the necessity of providing considerable quantities of storage means and a very great number of switching means.

In another known multiplying arrangement a multiplication panel based on the binary system and consisting of a plurality of electron tubes arranged in a matrix, is provided. The factors or number values to be multiplied are introduced sequentially in the form of impulses through input means respectively associated with the binary code elements $2^0$, $2^1$, $2^2$, etc., to the electron tubes arranged on the multiplication panel, only those tubes becoming conductive the grids of which are obtaining impulses from both factor inputs. In accordance with the sequence of impulses introduced, one part of the tubes becomes conductive and delivers through output circuits the product of said factors in binary form. It is a disadvantage of this ararngement that the switching operation is carried out sequentially which requires additional control means for the introduction of the impulses. Moreover, the use of a binary decimal system requires the provision of translator means for translating the product from a binary code to a binary decimal code.

It is, therefore, a main object of the invention to provide for a multiplying arrangement which is free of the above recited disadvantages of known arrangements.

It is another object of this invention to provide for an electric multiplying arrangement which requires only a fraction of the circuit and switching means usually needed in known arrangements.

It is still another object of this invention to provide for an electric multiplying arrangement which makes it possible to process one-digit number values introduced as factors in parallel in decimally coded form, but is capable of carrying out the multiplication procedure in a particularly simple manner by using an advantageous different code.

With above objects in view an electric multiplying arrangement for processing one-digit number values introduced as factors in parallel in decimally coded form, and for sequentially producing a multi-digit multiplication product in decimally coded form, comprises according to the invention, in combination, at least two groups of input means for introducing coded factor signals in parallel, each group consisting of "1" input means, "2" input means, "3" input means, and "5" input means, each of said groups having output terminals for "1," "2," "3," "4" and "5" factor signals, respectively; a plurality of coincidence circuit means, each connected with a different selected plurality of said output terminals, at least one terminal out of said plurality thereof being one of said "1," "2," "3," "4" and "5" output terminals of one of said groups, and at least one terminal out of said plurality thereof being one of said "1," "2," "3," "4" and "5" output terminals of the other one of said groups, each of said coincidence circuit means being capable of passing factor signals simultaneously introduced through said selected pluralities of output terminals, respectively, and having a signal output terminal for delivering a signal representing the final product of factor signals simultaneously introduced through said output terminals of said input means; and output means respectively connected to said signal output terminals of said coincidence circuit means for delivering output signals representing said final product in decimally coded form, output signals representing the different digits of said final product being delivered in parallel.

In a preferred embodiment of the invention, the plurality of coincidence circuit means mentioned in the preceding paragraph comprises a first group of coincidence circuit means for delivering signals, respectively, representing the final product of two one-digit number values both ranging between 1 and 5, a second group of coincidence circuit means for delivering signals, respectively, representing the final product of two one-digit number values, one of which ranges between 1 and 5 the other one of which ranges between 6 and 9, provided that the final product produced by said second group of coincidence means differs from any other product produced by said plurality of coincidence circuit means, and a third group of coincidence circuit means for delivering signals, respectively, representing the final product of two one-digit number values both ranging between 6 and 9, provided that the final product produced by said third group of coincidence circuit means differs from any other product produced by said plurality of coincidence circuit means.

In addition, said preferred embodiment of the invention comprises a plurality of blocking means respectively in circuit with said plurality of coincidence circuit means for blocking during any particular multiplying operation those coincidence circuit means which, unless blocked, would deliver a signal representing a partial product formed by signals representing components of said factors and being comprised in the number value of said final product.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 4 is intended to indicate in what relation the drawings FIG. 5–5e are to be arranged relative to each other in order to constitute a complete circuit diagram.

The arrangement described by way of example herebelow is particularly suited to be used within the framework of an electric calculating machine in which the number values are stored in a coded form based on the code 1, 2, 3, 5. Each number value can be represented in this storage code by four code digits, each code digit being represented by the presence or non-presence of a potential applied to certain components of the arrangements. For instance, the number value 8 is represented in this code by the sum of the code term representing 5 and the code term representing 3, while e.g. the number 9 is represented by the sum of the code terms representing 5, 3 and 1, as can be seen from the chart below wherein in the column I all the code terms representing the number values from 0 to 9 are shown in accordance with the 1, 2, 3, 5 code system. In using this code it is to be understood that any 0 in any term is represented by non-application of a potential to a particular channel while any code element 1 is represented by the application of a potential thereto.

|   | Storage Code | Calculating Code |
|---|---|---|
|   | I | II |
|   | 1235 | 012345 |
| 0 | 0000 | 100000 |
| 1 | 1000 | 010000 |
| 2 | 0100 | 001000 |
| 3 | 0010 | 000100 |
| 4 | 1010 | 000010 |
| 5 | 0001 | 100001 |
| 6 | 1001 | 010001 |
| 7 | 0101 | 001001 |
| 8 | 0011 | 000101 |
| 9 | 1011 | 000011 |

Figure 1:
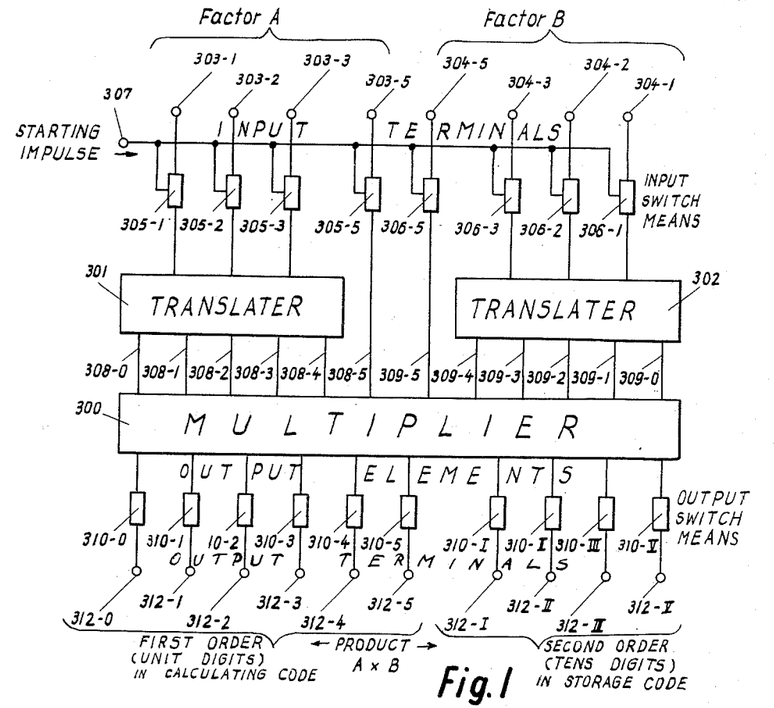
FIG. 1 is a block diagram illustrating diagrammatically the overall structure of an arrangement according to the invention.
Figure 2:
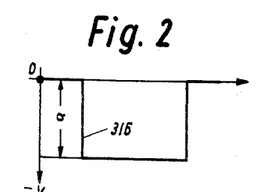
FIG. 2 is a schematic diagram illustrating the general form of the pulses used in operating the arrangement.

Referring now to FIG. 1, the entire arrangement comprises a multiplying section 300, translator arrangements 301, 302, input switch means 305–1, 305–2, 305–3, 305–5, 306–1, 306–2, 306–3, 306–5 and output switch means 310–0 to 310–5, 310–I, 310–II, 310–III, 310–V. Two one-digit number values or factors are introduced by simultaneously applying electric potentials to one or more of the input terminals 303–1 to 303–3 and 303–5, and to one or more of the input terminals 304–1 to 304–3 and 304–5, respectively, each of which terminals is assigned to or associated with the above listed individual digits of the code terms of the storage code in column I of the above chart. The processing of the introduced number values is started by the application of the negative starting impulse the form of which is illustrated by the curve 316 in FIG. 2. The voltage amplitude $a$ is approximately minus 65 volts. While this starting impulse is applied to an impulse input terminal 307, the desired ones of the input switch group 305 and of the group 306 are closed and in this manner the code elements representing 1, 2 and 3 in the storage code are introduced as impulse signals into the associated translator devices 301 and 302, respectively, where they are translated into code elements representing 0, 1, 2, 3, 4 in the calculating code. The signals representing the code elements 0, 1, 2, 3, 4 are then delivered to the multiplication section 300 via the connecting lines 308–0 to 308–4, 309–0 to 309–4, if necessary jointly with signals representing the code element 5 (which is not subjected to a translation) and thus introduced directly as impulse signals via the lines 308–5, 309–5, respectively. The decimal code of the type 0, 1, 2, 3, 4, 5 is used in this arrangement as a calculating code because this has the favorable effect that the multiplication section can be constructed in a particular simple manner. The structure of the calculating code is illustrated in the above chart in column II. In the multiplication section 300 a product of the introduced factor values is formed and is then delivered through the output switch means 310–0 to 310–5, 310–I, 310–II, 310–III and 310–V, respectively, and appears as a combination of impulse signals at the output terminals 312–0 to 312–5, 312–I, 312–II, 312–III and 312–V, respectively. In this embodiment the output terminals 312–0 to 312–5 are respectively associated with the unit digit of the product, while the output terminals 312–I to 312–V, respectively, are associated with the code elements representing the tens digit of the product, the arrangement being such that the unit digit is delivered in terms of the calculating code according to column II of the chart in order to be further processed in an adding mechanism not illustrated in FIG. 1, the tens digit however is delivered in terms of the storage code according to column I of the chart for being stored in a storage device not illustrated in FIG. 1.

The arrangement is essentially composed of a plurality of coincidence circuits which are of the known type of "and" circuits. A typical example of such coincidence circuits used in the arrangement according to the invention is illustrated as a component in FIG. 3. This circuit comprises the resistors 317, 318, 319 and a diode 323. The resistors 317 and 318 are connected at one end thereof to plus potential. Whenever a negative signal pulse is applied to one of the input terminals 320, 321, respectively, the potential at the output terminal 322 changes insignificantly only, for the following reason. If the pulse is applied to the terminal 321, almost no current flows across the resistor 319 on account of the blocking effect of the diode 323, while in the case of a pulse being applied to the input terminal 320 the voltage drop across the diode 323 operating in conductive condition, and across the resistor 318 is very small. Consequently a definable negative output signal appears at the output terminal 322 only if a negative signal is applied simultaneously to both input terminals 320 and 321. The just described elementary coincidence circuit can be expanded as an "and" circuit also by adding more input terminals as for instance 321–A and 321–B, shown in FIG. 3. However, these additional input terminals must be connected with the output terminal 322 across the additional diodes 323–A, 323–B, respectively, with resistors 318–A and 318–B, respectively, being arranged in a manner analogous to that described for the elementary circuit. If an expanded circuit is used as just described, then an output signal can be obtained only if input signals are introduced simultaneously at the input terminal 320 and at the input terminals 321, 321–A and 321–B.

Figure 4:
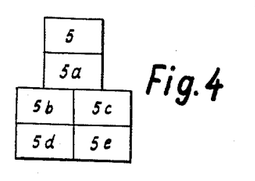

FIG. 4 will serve only to illustrate in what manner the individual sheets containing FIGS. 5, 5a, 5b, 5c, 5d and 5e are to be arranged relatively to each other in order to produce a complete circuit diagram of the whole arrangement according to the invention.

Figure 5:
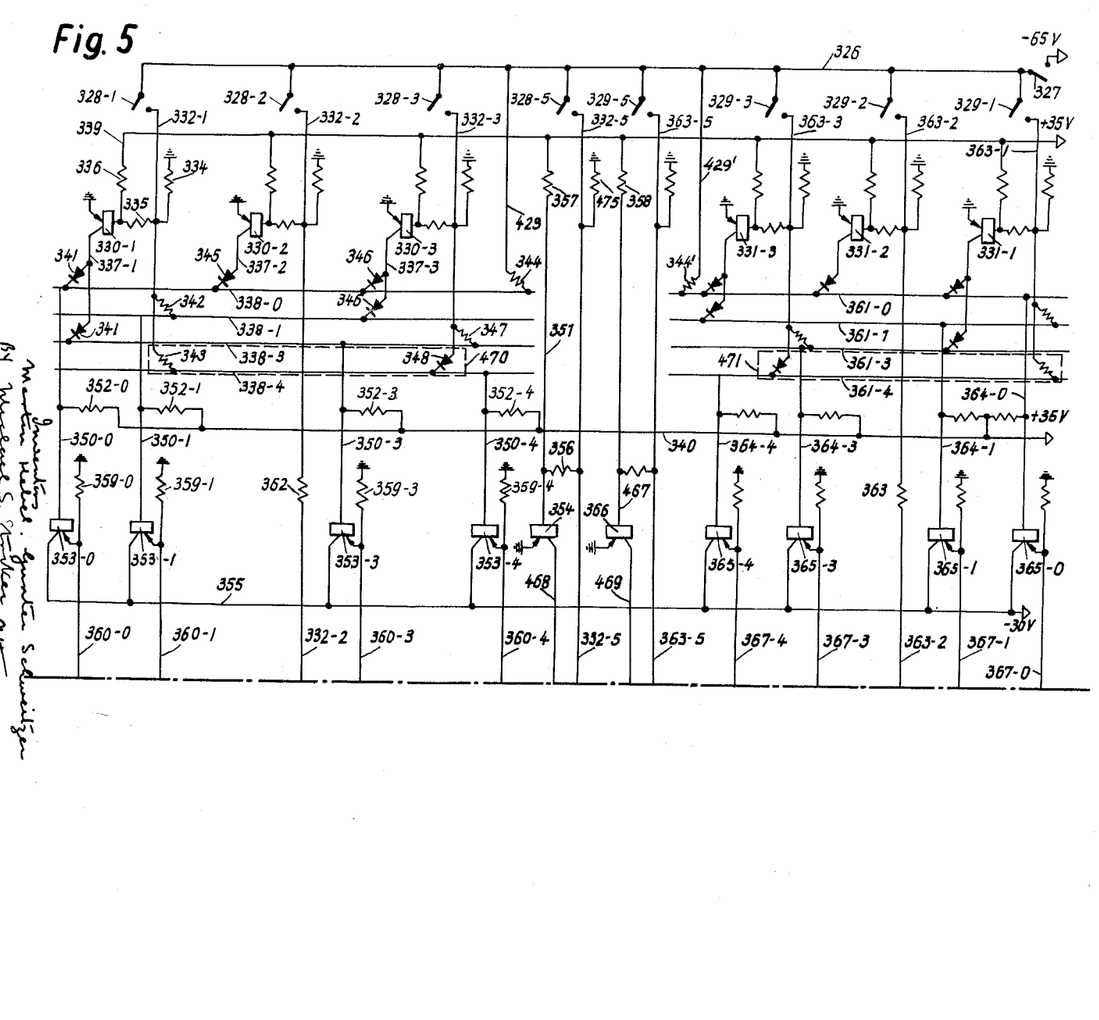
FIGS. 5–5e constitute together a complete circuit diagram of an electric multiplying arrangement according to the invention.

Referring now to the portion of the arrangement illustrated by FIG. 5, this being the input and translating section, switch means 328–1, 328–2, 328–3, 328–5 and 329–1, 329–2, 329–3, and 329–5 are provided which form two groups of input switches, each group being provided for introducing one of the two one-digit factors involved in a multiplication, and in each group each input switch means being associated with one of the code elements of the storage code according to column I of the above chart. The input terminals of the just mentioned input switches are jointly connected via a line 326 and a main input switch 327 with a source of −65 volts potential. The closing of any one of the input switches represents the introduction of a code element while the not-closing of one of these input switches represents the presence of no code element. To make this clear, if e.g. in the left hand group only the switch 328–2 is closed, the closing of the main switch 327 will introduce a signal impulse only across the input switch 328–2 with the result that a code term 0100 is introduced into the arrangement which code term represents the number value 2 according to the storage code. From the input switch 328–1 a line 332–1 leads via a resistor 335 to the base of a transistor 330–1 the emitter of which is connected to zero potential. The base of this transistor which is normally non-conductive is connected via a resistor 336 with a line 339 carrying plus 35 volts potential, while its collector is connected by a blocking line 337–1 and via diodes 341 to translating lines 338–0 and 338–3. Moreover, the line 332–1 is connected across a resistor 334 to zero potential. In the same manner the input switches 328–2, 328–3 are connected via lines 332–2, 332–3, respectively, with transistors 330–2, 330–3, respectively, associated respectively with diodes 345, 346, and 348, and translating lines 338–0, 338–1, 338–3 and 338–4, respectively, in the manner indicated by FIG. 5.

The input arrangement for the second one-digit factor is constructed in substantially the same manner as the arrangement just described. The number value of the second factor is introduced in terms of the storage code via input switches 329–1 to 329–3 and 329–5, which are likewise connected with the input line 326. By operation of this second group of input switches certain translating lines 361–0 to 361–4, respectively, are selected by means of connecting lines 363–1 to 363–3 in cooperation with transistors 331–1 to 331–3, respectively.

*The translator arrangements*

The cooperation of the transistors 330–1, 330–2, 330–3 with the translating lines 338–0, 338–1, 338–3, 338–4, respectively, serves for translating the representation of a number value in terms of a storage code 1, 2, 3, 5 into a representation in terms of the calculating code 0, 1, 2, 3, 4, 5, the details of these arrangements being also shown by FIG. 5. For this purpose blocking lines 337–1, 337–2, 337–3 lead from the transistors 330–1, 330–2, 330–3, respectively, via decoupling diodes 341, 345, 346, respectively, to the translating lines 338–0, 338–1, 338–3, respectively. Moreover the lines 332–1, 332–3 are connected via resistors 342, 343, 347, and the diode 348, respectively, with corresponding translating lines 338–1, 338–3 and 338–4. The individual translating lines 338–0, 338–1, 338–3 and 338–4 are associated with the code elements representing 0, 1, 3, 4, respectively, of the calculating code and are connected by lines 350–0, 350–1, 350–3, 350–4, respectively, with the bases of transistors 353–0, 353–1, 353–3, 353–4, respectively. The normally non-conductive transistors 353–0, 353–1, 353–3 and 353–4 serve to introduce a signal representing a number value via lines 360–0, 360–1, 360–2, 360–3, 360–4, respectively, into the multiplication section. The base of the transistor 353–0 is further connected across a resistor 352–0 with a line 340 carrying plus 35 volts potential, while its collector is connected with a line 355 carrying —30 volts potential. The emitter of the transistor 353–0 is connected across resistor 359–0 with zero potential, and the line 360–0 is connected to this emitter. The arrangement for the transistors 353–1, 353–3, 353–4 is exactly the same as can be seen from the diagram, and comprises the resistors 352–1, 352–3 and 352–4, respectively, and resistors 359–1, 359–3 and 359–4, respectively.

The translation of a number value from one code into the other is carried out in the following manner. Upon closing of at least one of the corresponding input switches 328–1 to 328–3, one of the translating lines 338–1, 338–3 and 338–4, respectively, associated with the particular number value is selected via the lines 332–1 to 332–3, respectively and the blocking lines 337–1 to 337–3, respectively, so that that one of the transistors 353–1, 353–3 and 353–4 which is associated with the selected translating line, is controlled hereby.

In this operation the blocking lines 337–1 to 337–3 operate in such a manner that only those translating lines are rendered conductive which correspond to the particular number value.

The following examples will help to understand the translating procedure.

If for instance the value "0" in terms of the storage code is introduced which means that all the input switches 328–1 to 328–3 and 328–5 remain in open position, then upon closing the contact or switch 327 only the translating line 338–0 assumes the negative potential applied via line 429 and resistor 344 whereby the transistor 353–0 is rendered conductive because its base is at a negative potential with respect to its emitter. Thus a negative signal impulse appears at the emitter which is then transmitted via the line 360–0 to the multiplication section as a signal representing the code element 0 in terms of the calculating code.

If the factor value "1" is introduced in terms of the storage code by closing only the input switch 328–1 while all the other input switches remain open, negative potential is applied to the translating line 338–1 via the resistor 342. The transistor 330–1 is rendered conductive, its collector assuming positive potential which is transferred via the blocking line 337–1 and the diode 341 to the translating line 338–0 whereby the latter is blocked and the transistor 353–0 is kept in non-conductive condition. Consequently, only the transistor 353–1 is rendered conductive via the resistor 342, translating line 338–1 and the connecting line 350–1 so that the output signal representing the code element "1" according to the calculating code appears on the output line 360–1.

For introducing a signal corresponding to the number value or factor "2" in terms of the storage code the input switch 328–2 is closed whereby a negative impulse is introduced via the line 332–2 and a resistor 362 directly into the multiplication section. Simultaneously the transistor 330–2 blocks again the translating line 338–0.

The factor "3" in terms of the storage code is introduced in a manner similar to that of the introduction of the factor "1" by closing the input switch 328–3, via the translating line 338–3, the resistor 347 and transistor 353–3 and a signal in terms of the calculating code is delivered via the output line 360–3, while the transistor 330–3 blocks the translating lines 338–0 and 338–1.

For introducing a signal representing the factor "4" in terms of the storage code the input switches 328–1 and 328–3 are closed simultaneously so that a negative potential is applied to the line 350–4 via the lines 332–1, 332–3, respectively, and via the coincidence circuit 470 consisting of the resistor 343, diode 348 and translating line 338–4. In this manner the transistor 353–4 is rendered conductive so that a negative signal representing the factor value "4" in terms of the calculating code appears in the output line 360–4. The transistors 330–1 and 330–3 are rendered conductive hereby so that the translating lines 338–0, 338–1 and 338–3 are kept at positive potential on account of the lines 337–1, 337–3 and the diodes 341 and 346, respectively.

The introduction of a signal representing the factor "5" is carried out differently. The introduction is started by closing the input switch 328–5 whereby the signal is introduced directly into the multiplication section via a line 332–5 which is connected across a resistor 475 with zero potential. On the other hand, the closing of only the switch 328–5 causes also the transistor 353–0 to become conductive via connection 429 and resistor 344 because in this case the translating line 338–0 is not blocked by any one of the transistors 330–1 to 330–3, none of the other switches 328–1 to 328–3 being closed. In this manner the factor "5" is represented by negative signals simultaneously appearing in the lines 360–0 and 332–5.

The translation procedure in the righthand group associated with the second factor is exactly analogous to the procedure described above so that signals representing the introduced number values or factors appear in the output lines 367–1 to 367–4 and 363–5 in terms of the calculating code for being introduced into the multiplication section.

*The multiplication section*

Figure 3:
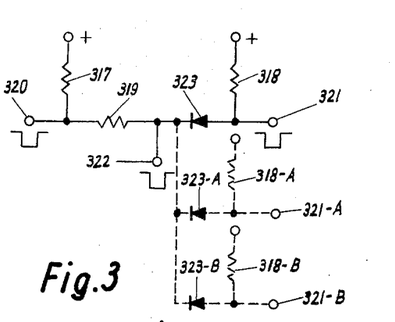
FIG. 3 is a diagrammatic circuit diagram illustrating an "and" circuit typical of the coincidence circuit means used in the arrangement according to the invention.

The multiplication section is illustrated by FIGS. 5a to 5e. Signals representing the factors in terms of the calculating code are introduced, as explained above, via the output lines 360–0, 360–1, 360–3 and 360–4, 332–2, 332–5, 367–0, 367–1, 367–3 and 367–4, 363–2 and 363–5, respectively. The multiplication section essentially consists of a plurality of coincidence circuits formed as "and" circuits 371 to 426 of the same general type which is illustrated in FIG. 3. The input terminals of these coincidence circuits are connected with the output lines 360–0, 360–1, 360–3 and 360–4, 332–2, 332–5, 367–0, 367–1, 367–3 and 367–4, 363–2 and 363–5, respectively. Each single one of these coincidence circuits is provided for the formation of one particular product. Along or near the vertical center line of FIG. 5a and along the righthand edge of FIG. 5b, and the lefthand edge of FIG. 5c a column is placed which shows all the multiplications of two one-digit factors which are carried out by the pertaining coincidence circuits.

If for instance a negative impulse is applied to the input terminals of the coincidence circuit 392 (FIG. 5a) consisting of the resistor 392–B and the diodes 392–C and 392–D in circuit with each other, by applying via output lines 360–1 and 332–5 signals representing in terms of the calculating code "1" and "5," while simultaneously a signal representing "5" is transmitted via line 363–5, then the product of a multiplication 6×5 is formed. The negative impulse appearing at the output of the coincidence circuit 392 and on the output line 392–A represents the product "30." In case that in only one of the output lines 360–1, 332–5 and 363–5 no impulse appears, but only on lines 332–5 and 363–5, which means that only the factors 5×5 have been introduced, then no signal is delivered via the output line 392–A of the coincidence circuit 392.

Figure 5A:
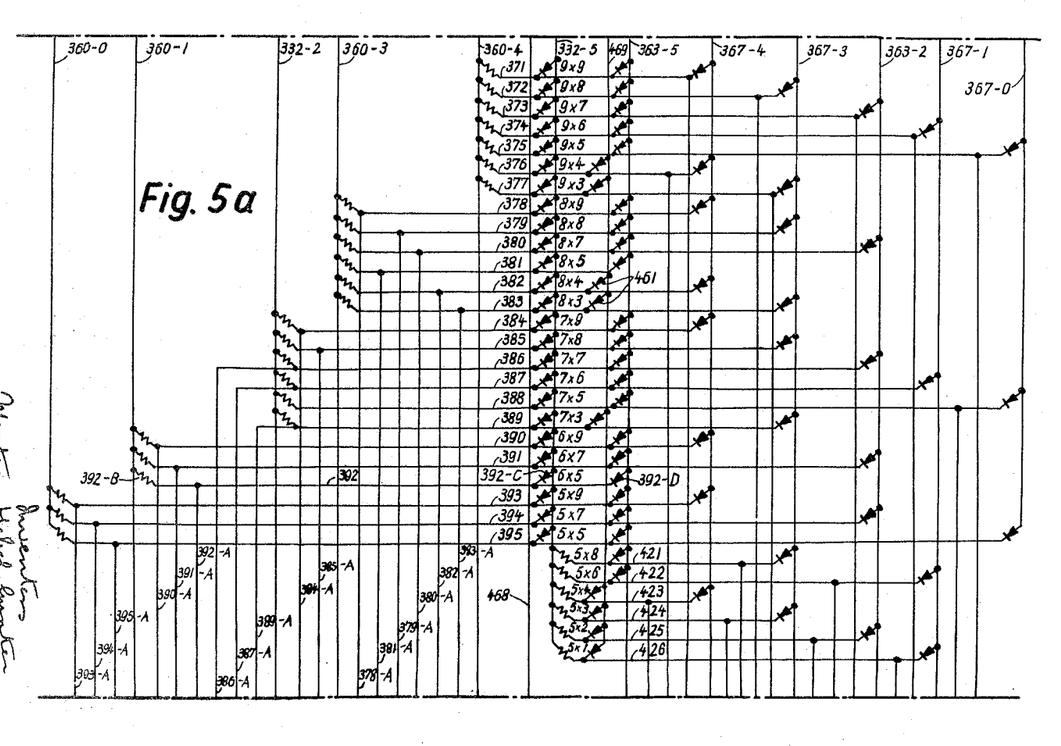
Figure 5B:
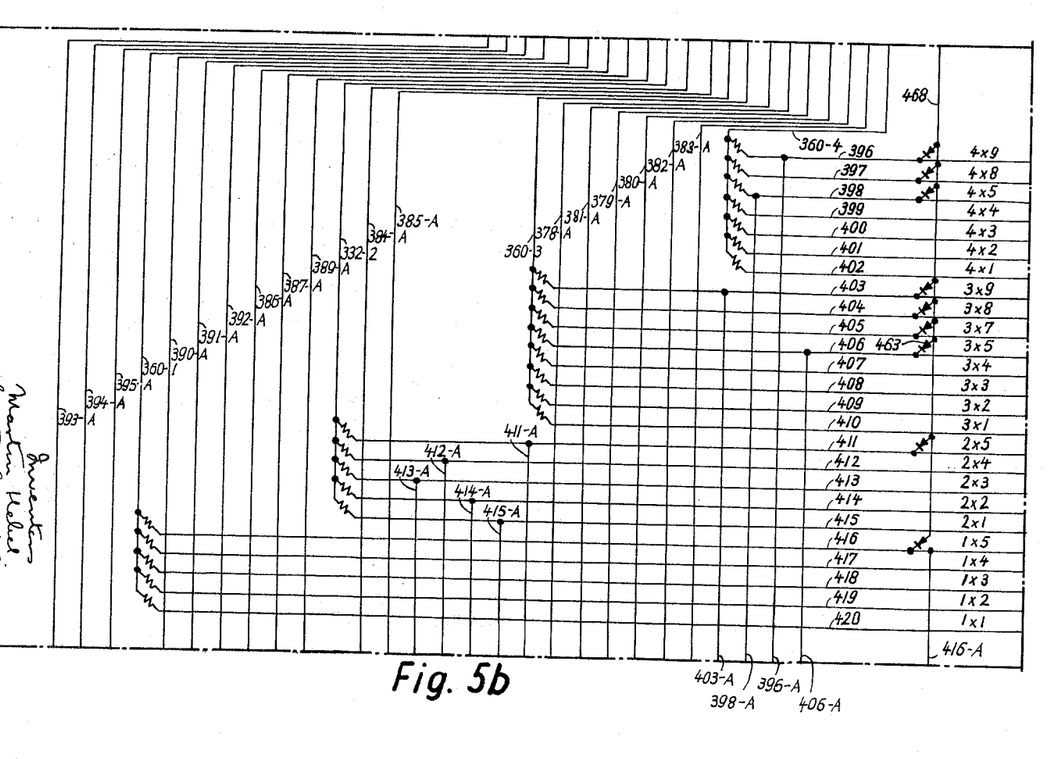
Figure 5C:
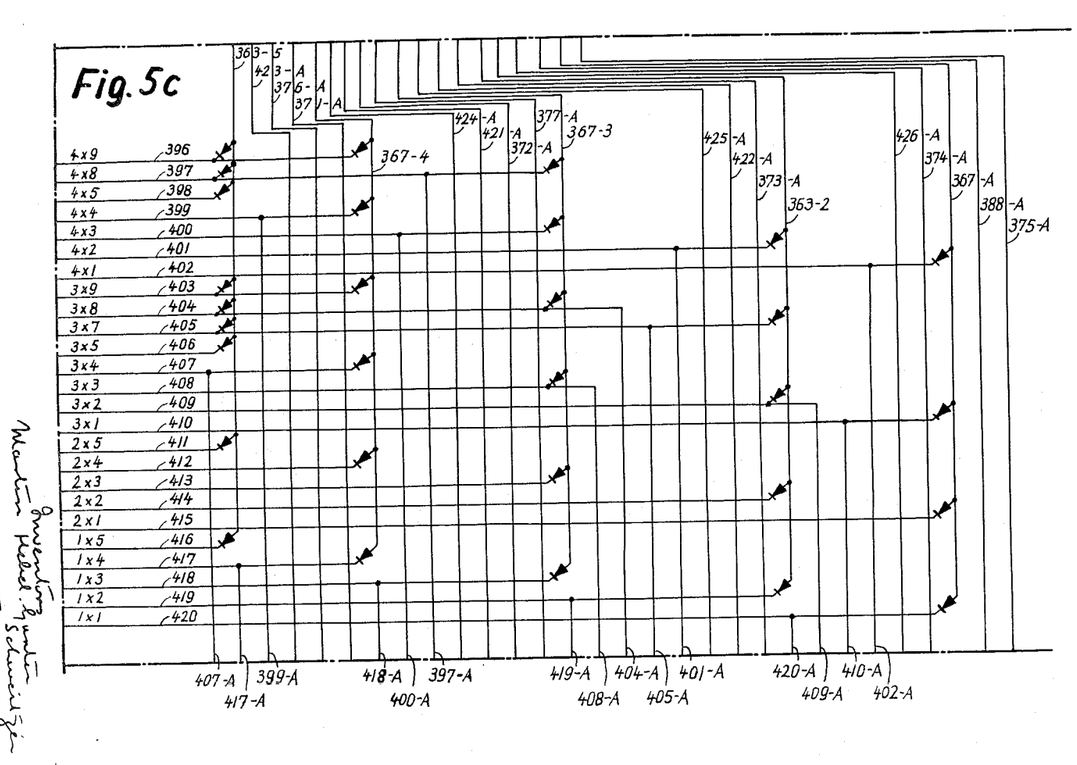

An inspection of the above-mentioned column in the center of FIG. 5a and in the corresponding portions of FIGS. 5b and 5c shows that this column does not contain the entire number of 81 possible multiplications of two one-digit numbers. Coincidence circuits are only provided for those of the 81 possible multiplications the factor and product code elements of which differ from the factor and product code elements of smaller or partial products comprised in the products listed in the column.

For instance, the multiplication 4×7=28 can be considered as being composed of:

$$4 \times (5+2) = (4 \times 5) + (4 \times 2) = 20 + 8$$

There are two partial products which can be formed by the coincidence circuits 398 and 401. In the output line 398–A of the coincidence circuit 398 appears a signal representing the number value "20" while the signal appearing in the output line 401–A of the coincidence circuit 401 represents the value "8"=5+3. The signals representing the tens-digit "2" and the unit digit "8" are delivered in parallel via output means comprising the line groups 430, 432, 433, respectively, and the pertaining output transistors 442, amplifiers 448 and output relays 458 which will be described further below. In an analogous manner all those other products are formed which are composed of partial products provided that the code elements of the factors as well as the code elements of the formed product are identical with the factors and product elements of the partial products. It can be seen that in the case of the multiplication 4×7 no specific coincidence circuit for this multiplication is needed because the product can be considered as being composed of the above-mentioned two partial products. The same condition is met under the assumption of using the above-mentioned calculating code, in the case of the following products:

$$1 \times 6 = 1 \times 1 + 1 \times 5 = 1 + 5$$
$$1 \times 7 = 1 \times 2 + 1 \times 5 = 2 + 5$$
$$1 \times 8 = 1 \times 3 + 1 \times 5 = 3 + 5$$
$$1 \times 9 = 1 \times 4 + 1 \times 5 = 4 + 5$$
$$2 \times 6 = 2 \times 1 + 2 \times 5 = 2 + 10$$
$$2 \times 7 = 2 \times 2 + 2 \times 5 = 4 + 10$$
$$2 \times 8 = 2 \times 3 + 2 \times 5 = (5+1) + 10$$
$$2 \times 9 = 2 \times 4 + 2 \times 5 = (5+3) + 10$$
$$3 \times 6 = 3 \times 1 + 3 \times 5 = 3 + (10+5)$$
$$4 \times 6 = 4 \times 1 + 4 \times 5 = 4 + 20$$
$$4 \times 7 = 4 \times 2 + 4 \times 5 = (5+3) + 20$$
$$6 \times 1 = 1 \times 1 + 5 \times 1 = 1 + 5$$
$$6 \times 2 = 1 \times 2 + 5 \times 2 = 2 + 10$$
$$6 \times 3 = 1 \times 3 + 5 \times 3 = 3 + (10+5)$$
$$6 \times 4 = 1 \times 4 + 5 \times 4 = 4 + 20$$
$$6 \times 6 = 1 \times 6 + 5 \times 6 = (5+1) + 30$$
$$6 \times 8 = 1 \times 8 + 5 \times 8 = (5+3) + 40$$
$$7 \times 1 = 2 \times 1 + 5 \times 1 = 2 + 5$$
$$7 \times 2 = 2 \times 2 + 5 \times 2 = 4 + 10$$
$$7 \times 4 = 2 \times 4 + 5 \times 4 = (5+3) + 20$$
$$8 \times 1 = 3 \times 1 + 5 \times 1 = 3 + 5$$
$$8 \times 2 = 3 \times 2 + 5 \times 2 = (5+1) + 10$$
$$8 \times 6 = 3 \times 1 + 5 \times 1 + 3 \times 5 + 5 \times 5$$
$$= (3+5) + (10+5) + (20+5)$$
$$9 \times 1 = 4 \times 1 + 5 \times 1 = 4 + 5$$
$$9 \times 2 = 4 \times 2 + 5 \times 2 = (5+3) + 10$$

In view of the above statement no specific coincidence circuits are required for carrying out the multiplications listed in the above chart because all these products can be formed by simultaneous production of the partial products and addition of these partial products formed in the coincidence circuits provided for these partial products.

It can be seen, that the entire plurality of coincidence circuits provided in this arrangement comprises three groups of coincidence circuits: a first group for delivering signals, respectively, representing the final product of two one-digit number values both ranging between 1 and 5, a second group of coincidence circuits for delivering signals, respectively, representing the final product of two one-digit number values, one of which ranges between 1 and 5, the other one of which ranges between 6 and 9, provided that the final product produced by said second group of coincidence circuits differs from any other product produced by the plurality of coincidence circuits, and a third group of coincidence circuits for delivering signals, respectively, representing the final product of two one-digit number values both ranging between 6 and 9, provided that the final product produced by said third group of coincidence circuits differs from any other product produced by the plurality of coincidence circuits.

In order to make the arrangements suitable for the above outlined type of operation, the output lines 371–A to 426–A of the coincidence circuits 371 to 426, respectively, are connected via decoupling diodes 472 (shown in FIGS. 5d and 5e) with groups of output lines 430, 432 and 433, respectively. The group of output lines 430 comprises the lines 430–I, 430–II, 430–III and 430–5 and serves to carry out a blocking function in connection with a line 431, as will be described below. The group of output lines 432 comprises the lines 432–1 to 432–5 and serves for receiving the unit digits of the products. The lines 432–1 to 432–5 are associated respectively with the code elements of the calculating code. Finally, the group of output lines 433 comprises the lines 433–I, 433–II, 433–III and 433–V and serves for receiving the tens elements of the products. The delivery of the tens elements is carried out in terms of the storage code so that the individual lines of the group of lines 433 are associated with code digits of the storage code. The lines 430–I, 430–II, 430–III, 430–5 are connected via lines 462–I, 462–II, 462–III, 462–5, respectively, and decoupling diodes 472 with the corresponding lines of the group of output lines 432 and 433.

Figure 5D:
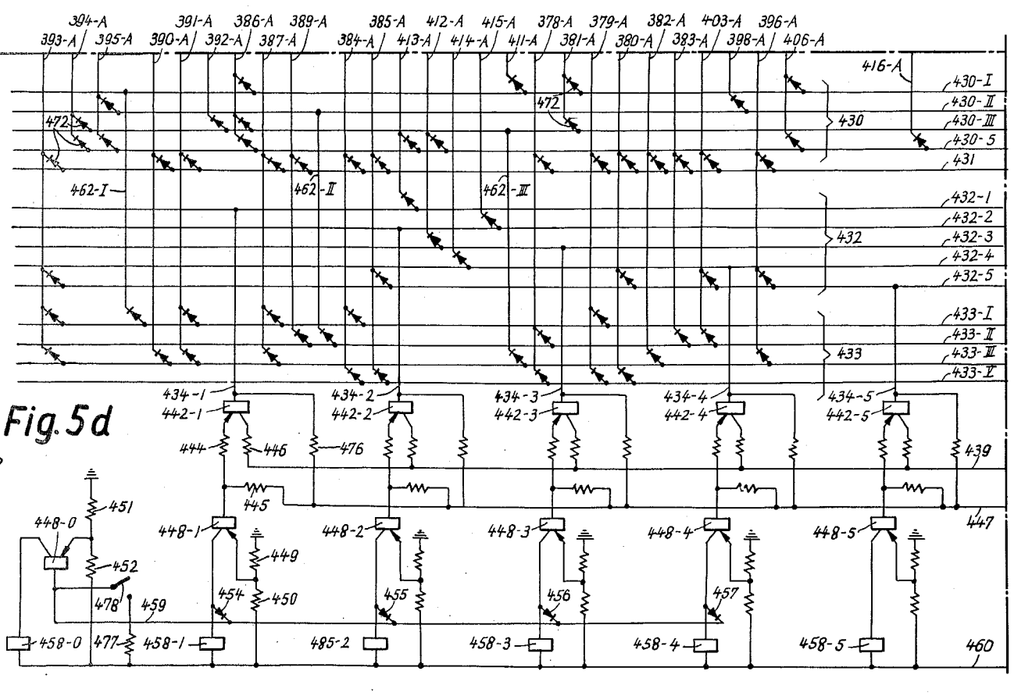
Figure 5E:
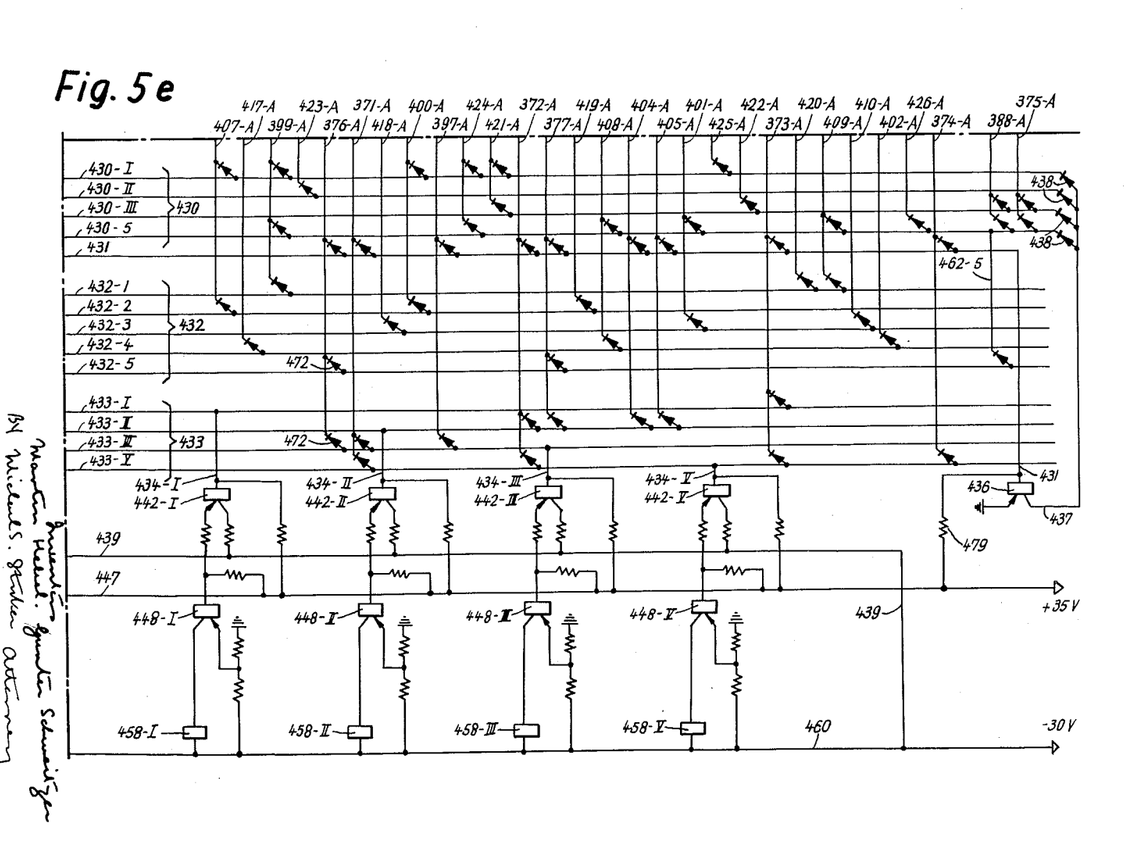

The lines of the 432 and 433 groups are connected via lines 434–1 to 434–5, 434–I to 434–III and 434–V, respectively, with the bases of the associated transistors 442–1 to 442–5, 442–I to 442–III and 442–V, respectively, which serve to deliver the results of the multiplication and which are respectively associated with the code elements 1, 2, 3, 4, 5 of the calculating code for the unit digits, and with the code elements I, II, III, V of the storage code representing the tens digit of the result.

For instance, the collector of the transistor 442–1 (FIG. 5d) is connected via a resistor 446 and a line 439 with a line 460 carrying —30 volts, while the emitter of this transistor is connected via a resistor 444 with the base of another transistor 448–1 acting as an amplifier for the output signal. Through the use of its emitter circuit it controls a relay 458–1 connected in its collector circuit. The base of the transistor 448–1 is connected via a resistor 445 with a line 447 carrying +35 volts, while its emitter is connected, on one hand, via a resistor 449 with zero potential, and, on the other hand, via a resistor 450 with a line 460 carrying —30 volts potential. The base of the transistor 442–1 is also connected via a resistor 476 with the line 447.

The transistor 442–1 as well as the transistor 448–1 is normally non-conductive. Whenever a negative impulse representing the code digit 1 is applied via the lines 432–1 and 434–1 to the base of the transistor 442–1 so as to render the base negative with respect to the emitter, the transistor 442–1 is rendered conductive. Hereby the emitter potential is lowered and a negative impulse appears at the base of the transistor 448–1 which causes this transistor also to become conductive. Hereby the relay 458–1 is energized so that through this relay a signal representing the code element "1" may be transmitted to any other device, not shown, but controlled by this relay.

For delivering other code elements, a similar arrangement is provided comprising the transistors 442–2 to 442–5, 442–I to 442–III and 442–V (FIGS. 5d, 5e) in connection with amplifier transistors 448–2 to 448–5, 448–I to 448–III and 448–V, respectively, and output relays 458–2 to 458–5, 458–I to 458–III and 458–V, respectively.

A line 431 leads to the base of a normally non-conductive transistor 436 the emitter of which is connected with zero potential. The collector of the transistor 436 is connected by a line 437 and by decoupling diodes 438 with the group of lines 430–I to 430–III and 430–5, respectively, while its base is connected through a resistor 479 with the line 447. Whenever the line 431 is rendered negative by a negative impulse the transistor 436 is rendered conductive whereby its collector is caused to assume a positive potential which is then transmitted by the line 437 to the corresponding lines 430 and thus renders the latter inoperative.

*Operation*

The operation of the multiplication section will now be described by reference to some examples.

In the case of products not exceeding the number value "4," e.g. 1×1, 1×2, 4×1, etc. a signal representing this product is transmitted via the output terminals of the corresponding coincidence circuits 402, 410, 414, 415 and 417 to 420 as a negative impulse to the lines 432–1 to 432–4, respectively, and are delivered thence to the components 442–1 to 442–4, 448–1 to 448–4, 458–1 to 458–4, respectively, as described above.

In the case of a multiplication of factors ranging between "5" and "9" i.e., composed of code elements "5" plus "1" up to "5" plus "4," as for instance $$8 \times 5 = (5+3) \times 5$$

the transistors 354, 366 (FIG. 5) become effective under the control of the input switches 328–5 and 329–5, these transistors 354 and 366 serving for suppressing any partial products which would be formed from the code elements of the factors. For instance, for forming the product 8×5, the coincidence circuit 381 produces upon input of signals via the lines 360–3, 332–5 and 363–5 an output signal in the line 381–A which represents the product 40. Simultaneously, however, the coincidence circuit 406 would be ready to produce the product 3×5 so as to produce a corresponding output signal because a negative impulse is also applied to its input terminal via the lines 360–3 and 363–5. In order to prevent the output of such a signal representing the partial product, the coincidence circuit 406 is connected via a decoupling diode 463 and a line 468 with the collector of the transistor 354. The base of this transistor operated by its emitter circuit is connected by a line 351 and a resistor 357 with the line 339 carrying +35 volt potential and is also connected by a resistor 356 with the line 332–5. Therefore, the closing of the input switch 328–5 causes the base of the transistor 354 to have negative potential relative to its emitter whereby the transistor 354 is rendered conductive. The positive potential thus appearing at its collector is now transmitted through the line 468 and the diode 463 to the coincidence circuit 406 and prevents thereby this coincidence circuit from delivering a negative signal. The second partial product 5×5 which could be formed, is in this case also prevented from being formed because the signals representing these two factors lack the required "0" required for forming a product 5×5 so that the coincidence circuit 395 provided for this product will not furnish an output signal.

In the same manner the line 468 is connected via diodes with the coincidence circuits 396 to 398, 403 to 405, 411 and 416 (FIG. 5b) so that also these coincidence circuits are prevented from forming the product for which they are provided, whenever a signal representing the value "5" is introduced.

In an analogous manner, in the section of the arrangement handling the second multiplication factor, a transistor 366 (FIG. 5) is associated with the input switch 329–5, this transistor 366 being connected via line 469 and decoupling diodes 461 with the coincidence circuits 376, 377, 382, 383, 389 and 423 to 426 (FIG. 5a). These coincidence circuits are therefore prevented from furnishing output signals whenever the input switch 329–5 is closed, as is described above.

The impulse appearing on line 381–A and representing the product of the multiplication 8×5 i.e. representing the value "40," is transmitted via the decoupling diodes 472 to the lines 430–I, 430–III and from there through the lines 462–I, 462–III to the lines 433–I and 433–III, respectively. Consequently, the transistors 442–I, 442–III are rendered conductive via the lines 434–I and 434–III, respectively, the last-mentioned transistors causing via transistors 448–I and 448–III, respectively, the energization of the output relays 458–I and 458–III, respectively which means the delivery of signals representing the number value "40."

The following example explains the multiplication 9×4. After signals representing these factors have been introduced by closing the input switches 328–1, 328–3, 328–5, 329–1 and 329–3 and after the coded signals have been translated in the above described translating arrangements, signals representing the code elements corresponding to the factor "9" are transmitted through the lines 360–4 and 332–5, and similarly signals representing the code elements corresponding to the value "4" are transmitted through the line 367–4 into the multiplication section. The coincidence circuit 376 (FIG. 5a) assigned to the product 9×4 thus obtains a negative impulse at all of its input terminals so that a negative impulse appears at its output terminal and output line 376–A. The line 376–A is connected via decoupling diodes 472 with the output lines 343–III, 432–5 and 431, respectively (FIG. 5e). Therefore, the negative impulse thus delivered, therefore, represents in the lines 433–III and 432–5 the numerical value 35=30+5.

However, together with the coincidence circuit 376, also the coincidence circuit 399 and 423 (FIGS. 5a, 5b and 5c) furnish output signals because the signals corresponding to the introduced "elements" appear also at the input terminals of these just named coincidence circuits. The coincidence circuits 399 and 423 are assigned to the partial products 4×4 and 5×4 of the factors represented by the code elements corresponding to the values "5" and "4." The output line 399–A of the coincidence circiut 399 is connected with the lines 430–1, 430–5 and 432–1 so that the impulse furnished by the coincidence circuit 399 represents the numerical values 10+5+1=16. Moreover the output line 423–A of the coincidence circuit 423 is connected with the line 430–II so that the impulse delivered by the coincidence circuit 423 represents the value "20." However, of these two values only the code element "1" is intended to contribute to the formation of the product 9×4 while the other code elements representing the values "10," "5" and "20" must be rendered ineffective. This is achieved by the impulse appearing in line 376–A which impulse is transmitted via a corresponding decoupling diode 472 and the line 431 to the transistor 436 and renders the latter conductive. Hereby the line 437 connected with the collector of this transistor obtains a positive potential which is transmitted by the diodes 438 to the lines 430 and compensates all negative impulses appearing there. The signal representing the values "10," "5," "20" appearing in the lines 430–I, 430–5 and 430–II are suppressed in this manner. The result "36" of the multiplication 9×4 is delivered in the form of the code elements representing "30," "5" and "1," respectively, furnished through the lines 433–III, 432–5, 432–1, respectively, and delivered via the lines 434–1, 434–5, 434–III, respectively, the transistors 442–1, 442–5, 442–III, 448–1, 448–5, 448–III, respectively, and through the relays 458–1, 458–5, 458–III, respectively, in the manner described above.

In a similar manner, in the formation of other products, the signals corresponding to code elements "5," "10," "20," "30," appearing in the line of the group 430 and representing such partial products which are comprised as partial products of factor code elements within larger products, are suppressed because in such case a signal corresponding to the partial product that would be formed, renders the transistor 436 conductive via line 431 so that hereby the group of lines 430 obtains positive potential. In contrast therewith, in all such cases the unit components of these partial products (code elements representing "1," "2," "3," "4") contribute to the product formation in the same manner as the code element "1" in the above described example. For instance, the product 9×7 is formed in the following manner:

9×7=(5+4)×(5+2)=(50+10)+(3)

In this case the coincidence circuit 373 assigned to the multiplication 9×7 produces the tens components "50" and "10" while the coincidence circuit 401 assigned to the multiplication 4×2 produces the unit component "3" of the final product. The formation of all other products is carried out in the same manner.

As has been stated above, the final delivery of the signal representing the unit digit of the formed product is to be carried out in terms of the calculating code in order to utilize the signals in subsequent calculating operations, as for instance additions. Therefore it is necessary that at the delivery of a signal representing the code element "5" through the output relay 458–5 also a signal representing the code element "0" is produced. This is effected by a transistor 448–0 (FIG. 5d), in the collector circuit of which a relay 458–0 is connected. The emitter of this transistor is connected, on one hand, via a resistor 451 with zero potential and, on the other hand, via a resistor 452 with line 460 while its base is connected, on one hand, via line 459 and diodes 454 to 457 with the collector lines of the transistor 448–1, 448–2, 448–3, 448–4 and on the other hand, via a switch contact 478 and a resistor 477 with the line 460. The switch contact 478 is mechanically or otherwise connected with the main switch 327 so that both are operated simultaneously. The normally non-conductive transistor 448–0 becomes conductive by the closing of the switch 478 simultaneously with the closing of the main switch 327, because in this case the base of this transistor obtains negative potential. The line 459 together with the diodes 454 to 457 constitutes an "or" circuit which becomes effective when at least one of the transistors 448–1 to 448–4 is in conductive condition. In such case the positive collector potential of that one of the transistors 448–1 to 448–4 which has been rendered conductive, is transmitted to the base of the transistor 448–0 and maintains the latter in nonconductive condition whenever the switch 478 is closed. The relay 458–0 consequently is energized only when a signal representing the unit component "0" and the unit component "5" both are delivered in which case the transistors 448–1 to 448–4 remain in non-conductive condition.

It will be understood that each of the elements described above, or two or more together, may also find a useful application in other types of "electric multiplying arrangements" differing from the types described above.

While the invention has been illustrated and described as embodied in an electric multiplying arrangement for processing one-digit number values introduced as factors in parallel in decimally coded form, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an electric multiplying arrangement for processing two one-digit number values introduced as factor signals in parallel in decimally coded form, and for sequentially producing a multi-digit multiplication product of said factors as output signals in decimally coded form, in combination, two groups of translating arrangements respectively associated with said factor signals, each having output terminals for delivering introduced factor signals as decimally coded "0," "1," "2," "3" and "4" signals, respectively; input means for introducing separately in cooperation with each of said groups of translating arrangements, respectively, a decimally coded "5" signal, respectively, and having each an output terminal for said decimally coded "5" signals; a plurality of multiplying coincidence circuits, each connected with a different selected plurality of said output terminals, at least one terminal out of said selected plurality thereof being one of said "0," "1," "2," "3," "4," "5" output terminals of one of said groups and input means, respectively, and at least one terminal out of said selected plurality thereof being one of said "0," "1," "2," "3," "4," "5" output terminals of the other one of said groups and the other one of said input means, respectively, each of said multiplying coincidence circuits being capable of combining factor signals simultaneously introduced through said selected pluralities of output terminals respectively, and having each a product signal output terminal for delivering a product signal of said factor signals simultaneously introduced into the respective coincidence circuits, said plurality of multiplying coincidence circuit means comprising a first group of coincidence circuit means for delivering signals, respectively, representing the final product of two one-digit number values both ranging between "1" and "5," a second group of coincidence circuit means for delivering signals, respectively, representing the final product of two one-digit number values, one of which ranging between "1" and "5," the other one of which ranging between "6" and "9," provided that the final product produced by said second group of coincidence circuit means differs from any other product produced by said plurality of coincidence circuit means, and a third group of coincidence circuit means for delivering signals, respectively, representing the final product of two one-digit number values both ranging between "6" and "9," provided that the final product produced by said third group of coincidence circuit means differs from any other product produced by said plurality of coincidence circuit means; a plurality of blocking means respectively in circuit with said plurality of coincidence circuit means for blocking during any particular multiplying operation those coincidence circuit means which, unless blocked, would deliver a signal representing a partial product formed by signals representing components of said factors and being comprised in the number value of said final product; and output means respectively connected to said product signal output terminals for delivering final product output signals representing said final product in decimally coded form, the output signals representing the different digits of said final product being delivered in parallel.

2. In an electric multiplying arrangement for processing two one-digit number values introduced as factor signals in parallel in decimally coded form, and for sequentially producing a multi-digit multiplication product of said factors as output signals in decimally coded form, in combination, two groups of translating arrangements respectively associated with said factor signals, each having output terminals for delivering introduced factor signals as decimally coded "0," "1," "2," "3," and "4" signals, respectively; input means for introducing separately in cooperation with each of said groups of translating arrangements, respectively, a decimally coded "5" signal, respectively, and having each an output terminal for said decimally coded "5" signals; a plurality of multiplying coincidence circuits, each connected with a different selected plurality of said output terminals, at least one terminal out of said selected plurality thereof being one of said "0," "1," "2," "3," "4," "5" output terminals of one of said groups and input means, respectively, and at least one terminal out of said selected plurality thereof being one of said "0," "1," "2," "3," "4," "5" output terminals of the other one of said groups and the other one of said input means, respectively, each of said multiplying coincidence circuits being capable of combining factor signals simultaneously introduced through said selected pluralities of output terminals, respectively, and having each a product signal output terminal for delivering a product signal of said factor signals simultaneously introduced into the respective coincidence circuits, said plurality of multiplying coincidence circuit means comprising a first group of coincidence circuit means for delivering signals, respectively, representing the final product of two one-digit number values both ranging between "1" and "5," a second group of coincidence circuit means for delivering signals, respectively, representing the final product of two one-digit number values, one of which ranging between "1" and "5," the other one of which ranging between "6" and "9," provided that the final product produced by said second group of coincidence circuit means differs from any other product produced by said plurality of coincidence circuit means, and a third group of coincidence circuit means for delivering signals, respectively, representing the final product of two one-digit number values both ranging between "6" and "9," provided that the final product produced by said third group of coincidence circuit means differs from any other product produced by said plurality of coincidence circuit means; a plurality of blocking means respectively in circuit with said plurality of coincidence circuit means for blocking during any particular multiplying operation those coincidence circuit means which, unless blocked, would deliver a signal representing a partial product formed by signals representing components of said factors and being comprised in the number value of said final product, the blocking means in circuit with the coincidence circuits of said second and third group being also connected with at least one of said input means for being controlled thereby in such a manner that, when a factor is introduced composed of "5" and at least one of the factors smaller than "5" by means of simultaneously introduced factor signals representing "5" and one of the smaller digits "1" to "4," respectively, those coincidence circuits which, unless blocked, would form partial products of at least one of said smaller digits with the other factor appearing in said second group, or with said smaller digits comprised in the other factor of said third group, are blocked; and output means respectively connected to said product signal output terminals for delivering final product output signals representing said final product in decimally coded form, the output signals representing the different digits of said final product being delivered in parallel.

3. An arrangement as set forth in claim 2, wherein the coincidence circuit means of said second and third group are so connected with said output means and with said blocking means that only signals representing the tens digits of the final product and representing the "5" component of the unit digits of the final product are delivered, and that the smaller unit digits of the final product are represented by signals representing the product of factor elements ranging between "1" and "4," and wherein said output means include output blocking means connected with said coincidence circuits of said second and third group for being controlled thereby in such a manner that output signals which would, unless blocked, represent "5" or tens digits as said product of factor elements are suppressed, unless such signals representing "5" and tens digits of the final product are contained in said product output signals delivered by said coincidence circuit means.

4. An arrangement as set forth in claim 2, wherein said output means comprise a first group of output means for delivering product output signals representing the unit digits of said products in terms of one decimal code, and a second group of output means for delivering product output signals representing the tens digits of said products in terms of a different decimal code.

5. An arrangement as set forth in claim 4, wherein the coincidence circuit means of said second and third group are so connected with said output means and with said blocking means that only signals representing the tens digits of the final product and representing the "5" component of the unit digits of the final product are delivered, and that the smaller unit digits of the final product are represented by signals representing the product of factor elements ranging between "1" and "4," and wherein said output means include output blocking means connected with said coincidence circuits of said second and third group for being controlled thereby in such a manner that output signals which would, unless blocked, represent "5" or tens digits as said product of factor elements are suppressed, unless such signals representing "5" and tens digits of the final product are contained in said product output signals delivered by said coincidence circuit means.

6. An arrangement as set forth in claim 5, wherein said translating arrangements each comprises a plurality of translating lines, at least one coincidence circuit and blocking means in circuit therewith for translating factor signals introduced in terms of a decimal 1, 2, 3, 5 code into signals in terms of a decimal 0, 1, 2, 3, 4, 5 code.

7. An arrangement as set forth in claim 6, wherein said translating arrangements each comprises electronic switch means connected between said translating lines and said output terminals thereof, respectively, for controlling the delivery of said coded "0," "1," "2," "3," "4" signals.

8. An arrangement as set forth in claim 7, wherein said output means comprise three groups of output lines respectively connected with said product output terminals of said plurality of multiplying coincidence circuit means, respectively, for delivering said final product output signals.

9. An arrangement as set forth in claim 8, wherein the first group of said output lines is associated, respectively, with said output signals representing the "5" and the tens digits components "10," "20," "30" of said products of factor elements, and wherein said output blocking means are connected in circuit with said first group of output lines for suppressing said signals representing "5" and the tens digits "10," "20," "30" whenever required.

10. An arrangement as set forth in claim 9, wherein the second and third group of said output lines is connected, respectively, with said first group thereof for receiving the signals representing the unit and tens digits of the final product.

11. An arrangement as set forth in claim 10, wherein said output means comprise for each product signal output terminal a group of output control means, each comprising a control transistor and an amplifying transistor in circuit therewith, and an output relay controlled by said amplifying transistor.

12. An arrangement as set forth in claim 11, wherein each of said multiplying coincidence circuits is constituted as an "and" circuit comprising a first input terminal, an ohmic resistance and a diode in series therewith, and a second input terminal, an output terminal connected to a junction point between said resistance and said diode, and two ohmic resistances, each being respectively connected between one of said input terminals and a source of potential of a polarity opposite to that applied to said input terminals so that an output signal is delivered by said output terminal only when signals of identical polarity are simultaneously applied to both said input terminals of said coincidence circuit.

13. An arrangement as set forth in claim 12, wherein at least one second combination of an input terminal, an ohmic resistance connected between said last mentioned input terminal and said source of opposite polarity, and a diode is connected with said junction point so that an output signal is delivered by said output terminal only when signals of identical polarity are simultaneously applied to all of said terminals of said coincidence circuit.

14. An arrangement as set forth in claim 13, wherein said blocking means are normally non-conductive transistors so connected that they apply a blocking potential to the lines connected therewith for blocking the latter whenever the particular transistor is rendered conductive.

15. In an electric multiplying arrangement for processing two one-digit number values introduced as factor signal pulses in parallel in decimally coded form, and for sequentially producing a multiplication product of the one-digit factors as output signals in decimally coded form, in combination, a first group of multiplying coincidence circuit means for producing decimally coded output signals representing all those multiplication products which are derived from factor signals each represented by a single code-element pulse, a second group of multiplying coincidence circuit means for producing decimally coded output signals representing all those multiplication products which are derived from factor signals at least one of which is represented by a combination of more than one code-element pulse, while the other factor signal is represented by at least one single code-element pulse, the number of multiplying coincidence circuit means in said second group thereof being restricted to one such coincidence circuit means each for producing those multiplication products whose code-elements as well as the code-elements of the corresponding factor signals differ from the code-elements of the multiplication factors and of the corresponding factor signals produced and processed, respectively, by said first group of coincidence circuit means; and a plurality of blocking means respectively in circuit with said first and second group of coincidence circuit means for blocking during any particular multiplying operation those coincidence circuit means which, unless blocked, would deliver an output signal representing a partial product formed from factor pulses representing partial components of the particular factors which are being processed, and thus comprised in the number value of the product to be formed of the whole factors.

16. In an electric multiplying arrangement for processing two one-digit number values introduced as factor signals in parallel in decimally coded form, and for sequentially producing a multiplication product of the one-digit factors as output signals in decimally coded form, in combination, first input means for receiving input signals in the form of input pulses representing respectively decimal code elements of a one-digit multiplier number and having a plurality of output terminals respectively assigned to the different orders of the particular decimal code, for respectively delivering in parallel, corresponding to the received input signals, decimally coded signals in the form of factor pulses respectively representing decimal code elements of said one-digit multiplier number; second input means for receiving input signals in the form of input pulses representing respectively decimal code elements of a one-digit multiplicand number and having a plurality of output terminals respectively assigned to the different orders of the particular decimal code, for respectively delivering in parallel, corresponding to the received input signals, decimally coded signals in the form of factor pulses respectively representing decimal code elements of said one-digit multiplicand number; multiplier means comprising a first group of multiplying coincidence circuit means each connected to a different combination of one of said output terminals of said first input means and one output terminal of said second input means, for multiplying one-digit factors which are represented each by a single code element and correspondingly by a single one said factor pulses, and for delivering a decimally coded output signal representing the product of said one-digit factor; a second group of multiplying coincidence circuit means each connected to a different combination of more than one of said output terminals of either one of said input means and at least one of said output terminals of the other one of said output means, for multiplying a combination of one-digit factors of which at least one is represented by more than one code-element and correspondingly by a plurality of simultaneously delivered ones of said factor pulses, for delivering a decimally coded product output signal representing the product of said combination of one-digit factors, the number of coincidence circuit means of said second group thereof being restricted to one such coincidence circuit means each for those possible multiplications, respectively, which result from factors whose code-elements differ from the code-elements which are processed by said first group of coincidence circuit means, and which result in a product whose code-elements differ from the code-elements representing a product formed by said first group of coincidence circuit means; a plurality of blocking means respectively in circuit with said coincidence circuit means for blocking during any particular multiplying operation those coincidence circuit means which, unless blocked, would deliver an output signal representing a partial product formed from pulses representing partial components of the particular factors which are being processed, and thus comprised in the number value of the product to be formed of the whole factors; and output means respectively connected to said coincidence circuit means for delivering said product output signals in the form of pulses in parallel, representing the decimal code-elements of the particular product.

17. An arrangement as claimed in claim 16, wherein said output means comprise a first group of output means for delivering product output signals representing the unit digits of said products in terms of one decimal code, and a second group of output means for delivering product output signals representing the tens digits of said products in terms of a different decimal code.

18. In an electric multiplying arrangement for processing two one-digit number values introduced as factor signals in parallel in decimally coded form, and for sequentially producing a multiplication product of the one-digit factors as output signals in decimally coded form, in combination, first input means for receiving input signals in the form of input pulses representing respectively decimal code elements of a one-digit multiplier number and having a plurality of output terminals respectively assigned to the different orders of the particular decimal code, for respectively delivering in parallel, corresponding to the received input signals, decimally coded "0," "1," "2," "3," "4" and "5" signals in the form of factor pulses respectively representing decimal code elements of a one-digit multiplier number ranging from "1" to "5"; second input means for receiving input signals in the form of input pulses representing respectively decimal code elements of a one-digit multiplicand number and having a plurality of output terminals respectively assigned to the different orders of the particular decimal code, for respectively delivering in parallel, corresponding to the received input signals, decimally coded "0," "1," "2," "3," "4" and "5" signals in the form of factor pulses respectively representing decimal code elements of a one-digit multiplicand number ranging from "1" to "5"; multiplier means comprising a first group of multiplying coincidence circuit means each connected to a different combination of one of said output terminals of said first input means and one output terminal of said second input means, for multiplying one-digit factors ranging between "0" and "4" which are represented each by a single code element and correspondingly by a single one of said factor pulses and for delivering a decimally coded output signal representing the product of said one-digit factors; a second group of multiplying coincidence circuit means each connected to a different combination of more than one of said output terminals of either one of said input means and at least one of said output terminals of the other one of said output means, for multiplying a combination of one-digit factors of which at least one is in the range between "5" and "9" and represented by more than one code-element and correspondingly by a plurality of simultaneously delivered ones of said factor pulses, for delivering a decimally coded product output signal representing the product of said combination of one-digit factors, the number of coincidence circuit means of said second group thereof being restricted to one such coincidence circuit means each for those possible multiplications, respectively, which result from factors whose code-elements differ from the code-elements which are processed by said first group of coincidence circuit means, and which result in a product whose code-elements differ from the code-elements representing a product formed by said first group of coincidence circuit means; a plurality of blocking means respectively in circuit with said coincidence circuit means for blocking during any particular multiplying operation those coincidence circuit means which, unless blocked, would deliver an output signal representing a partial product formed from pulses representing partial components of the particular factors which are being processed, and thus comprised in the number value of the product to be formed of the whole factors; and output means respectively connected to said coincidence circuit means for delivering said product output signals in the form of pulses in parallel, representing the decimal code-elements of the particular product.

19. An arrangement as claimed in claim 18, wherein said output means comprise a first group of output means for delivering product output signals representing the unit digits of said products in terms of one decimal code, and a second group of output means for delivering product output signals representing the tens digits of said products in terms of a different decimal code.

20. An arrangement as claimed in claim 18, wherein the blocking means in circuit with said second group of coincidence circuit means are also connected with at least one of said input means for being controlled thereby in such a manner that blocking action takes place when factor signal pulses are delivered representing a factor composed of "5" and at least one of the digits smaller than "5."

21. An arrangement as claimed in claim 20, wherein the coincidence circuit means of said second group thereof are so connected with said output means and with said blocking means that only product output signals representing the "tens" digits of the final product and representing the "5" component of the unit digits of the final product are delivered directly, while the smaller unit digits of the final product are represented by output signals representing the product of factor components ranging between "1" and "4," and wherein said output means include output blocking means connected with said coincidence circuit means of said second group thereof for being controlled thereby in such a manner that product output signals which would, unless blocked, represent "tens" digits or "5" as said product of factor components, are suppressed unless such signals representing "tens" digits and "5" of the final product are contained in said product output signals delivered by said coincidence circuit means.

References Cited in the file of this patent

UNITED STATES PATENTS

| | | |
|---|---|---|
| 2,672,283 | Havens | Mar. 16, 1954 |
| 2,895,672 | Dickinson | July 21, 1959 |